US009489337B2

(12) United States Patent
Stark

(10) Patent No.: US 9,489,337 B2
(45) Date of Patent: Nov. 8, 2016

(54) PICOENGINE MULTI-PROCESSOR WITH TASK ASSIGNMENT

(71) Applicant: Netronome Systems, Inc., Santa Clara, CA (US)

(72) Inventor: Gavin J. Stark, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 392 days.

(21) Appl. No.: 14/251,592

(22) Filed: Apr. 12, 2014

(65) Prior Publication Data

US 2015/0293792 A1     Oct. 15, 2015

(51) Int. Cl.
| | |
|---|---|
| *G06F 15/80* | (2006.01) |
| *G06F 9/50* | (2006.01) |
| *G06F 9/48* | (2006.01) |
| *G06F 9/38* | (2006.01) |
| *G06F 9/30* | (2006.01) |
| *G06F 1/32* | (2006.01) |

(52) U.S. Cl.
CPC ............ *G06F 15/80* (2013.01); *G06F 1/3237* (2013.01); *G06F 1/3275* (2013.01); *G06F 1/3287* (2013.01); *G06F 9/30047* (2013.01); *G06F 9/30076* (2013.01); *G06F 9/38* (2013.01); *G06F 9/3802* (2013.01); *G06F 9/3877* (2013.01); *G06F 9/3885* (2013.01); *G06F 9/4843* (2013.01); *G06F 9/5027* (2013.01); *G06F 9/5038* (2013.01); *G06F 15/8007* (2013.01); *G06F 15/8046* (2013.01); *G06F 15/8053* (2013.01); *Y02B 60/1221* (2013.01); *Y02B 60/1225* (2013.01); *Y02B 60/1228* (2013.01); *Y02B 60/1282* (2013.01)

(58) Field of Classification Search
None
See application file for complete search history.

(56) References Cited

U.S. PATENT DOCUMENTS

| | | | | |
|---|---|---|---|---|
| 2004/0078093 | A1* | 4/2004 | Fujii | ................... G06F 15/8007 700/2 |
| 2005/0257024 | A1* | 11/2005 | Ray | ....................... G06F 9/3001 712/11 |
| 2011/0191567 | A1* | 8/2011 | Lancaster | ............ G06F 9/3887 712/22 |

* cited by examiner

*Primary Examiner* — Qing Wu
(74) *Attorney, Agent, or Firm* — Imperium Patent Works LLP; T. Lester Wallace; Mark D. Marrello

(57) ABSTRACT

A general purpose PicoEngine Multi-Processor (PEMP) includes a hierarchically organized pool of small specialized picoengine processors and associated memories. A stream of data input values is received onto the PEMP. Each input data value is characterized, and from the characterization a task is determined. Picoengines are selected in a sequence. When the next picoengine in the sequence is available, it is then given the input data value along with an associated task assignment. The picoengine then performs the task. An output picoengine selector selects picoengines in the same sequence. If the next picoengine indicates that it has completed its assigned task, then the output value from the selected picoengine is output from the PEMP. By changing the sequence used, more or less of the processing power and memory resources of the pool is brought to bear on the incoming data stream. The PEMP automatically disables unused picoengines and memories.

21 Claims, 7 Drawing Sheets

PICOENGINE MULTI-PROCESSOR

PICOENGINE MULTI-PROCESSOR

PICOENGINE POOL

SIX SEQUENCES FOR PICKING PICOENGINES
(ONE OF WHICH IS SELECTED)

TRANSLATOR CIRCUITRY

| 6:1 MUX | MUXIN1 (SEQ #1) | MUXIN2 (SEQ #2) | MUXIN3 (SEQ #3) | MUXIN4 (SEQ #4) | MUXIN5 (SEQ #5) | MUXIN6 (SEQ #6) |
|---|---|---|---|---|---|---|
| 1 | 1 | 1 | 1 | 1 | 1 | 1 |
| 2 | 13 | 5 | 4 | 13 | 2 | 2 |
| 3 | 25 | 9 | 7 | 25 | 3 | 3 |
| 4 | 37 | 13 | 10 | 37 | 4 | 4 |
| 5 | 2 | 2 | 13 | 4 | 5 | 13 |
| 6 | 14 | 6 | 16 | 16 | 6 | 14 |
| 7 | 26 | 10 | 19 | 28 | 7 | 15 |
| 8 | 38 | 14 | 22 | 40 | 8 | 16 |
| 9 | 3 | 3 | 25 | 7 | 9 | 25 |
| 10 | 15 | 7 | 28 | 19 | 10 | 26 |
| 11 | 27 | 11 | 31 | 31 | 11 | 27 |
| 12 | 39 | 15 | 34 | 43 | 12 | 28 |
| 13 | 4 | 4 | 37 | 10 | 13 | 37 |
| 14 | 16 | 8 | 40 | 22 | 14 | 38 |
| 15 | 28 | 12 | 43 | 34 | 15 | 39 |
| 16 | 40 | 16 | 46 | 46 | 16 | 40 |
| 17 | 5 | 17 | 2 | 2 | 17 | 5 |
| 18 | 17 | 21 | 5 | 14 | 18 | 6 |
| 19 | 29 | 25 | 8 | 26 | 19 | 7 |
| 20 | 41 | 29 | 11 | 38 | 20 | 8 |
| 21 | 6 | 18 | 14 | 5 | 21 | 17 |
| 22 | 18 | 22 | 17 | 17 | 22 | 18 |
| 23 | 30 | 26 | 20 | 29 | 23 | 19 |
| 24 | 42 | 30 | 23 | 41 | 24 | 20 |
| 25 | 7 | 19 | 26 | 8 | 25 | 29 |
| 26 | 19 | 23 | 29 | 20 | 26 | 30 |
| 27 | 31 | 27 | 32 | 32 | 27 | 31 |
| 28 | 43 | 31 | 35 | 44 | 28 | 32 |
| 29 | 8 | 20 | 38 | 11 | 29 | 41 |
| 30 | 20 | 24 | 41 | 23 | 30 | 42 |
| 31 | 32 | 28 | 44 | 35 | 31 | 43 |
| 32 | 44 | 32 | 47 | 47 | 32 | 44 |
| 33 | 9 | 33 | 3 | 3 | 33 | 9 |
| 34 | 21 | 37 | 6 | 15 | 34 | 10 |
| 35 | 33 | 41 | 9 | 27 | 35 | 11 |
| 36 | 45 | 45 | 12 | 39 | 36 | 12 |
| 37 | 10 | 34 | 15 | 6 | 37 | 21 |
| 38 | 22 | 38 | 18 | 18 | 38 | 22 |
| 39 | 34 | 42 | 21 | 30 | 39 | 23 |
| 40 | 46 | 46 | 24 | 42 | 40 | 24 |
| 41 | 11 | 35 | 27 | 9 | 41 | 33 |
| 42 | 23 | 39 | 30 | 21 | 42 | 34 |
| 43 | 35 | 43 | 33 | 33 | 43 | 35 |
| 44 | 47 | 47 | 36 | 45 | 44 | 36 |
| 45 | 12 | 36 | 39 | 12 | 45 | 45 |
| 46 | 24 | 40 | 42 | 24 | 46 | 46 |
| 47 | 36 | 44 | 45 | 36 | 47 | 47 |
| 48 | 48 | 48 | 48 | 48 | 48 | 48 |

CONNECTIONS MADE IN THE CONNECTION MATRIX

FIG. 7

PICOENGINE DISABLE/ENABLE CIRCUIT

MEMORY DISABLE/ENABLE CIRCUIT

PICOENGINE MULTI-PROCESSOR WITH TASK ASSIGNMENT

TECHNICAL FIELD

The described embodiments relate generally to multi-processor circuits usable for analyzing and processing input data values, of a stream of input data values, and thereby generating a stream of output data values.

SUMMARY

In a first novel aspect, a general purpose "PicoEngine Multi-Processor" (PEMP) circuit includes, among other parts, a data characterizer, a picoengine and task assignor, a picoengine pool, and an output data reader. The picoengine pool includes a large number of small specialized processors referred to as "picoengines", as well as a plurality of associated memories that contain programs that the picoengines can execute. The picoengines and memories may be laid out across a surface of an integrated circuit with a particular hierarchical organization. In one example, groups of picoengines have access to a local memory. Groups are in turn organized into clusters, with each cluster having access to a corresponding larger shared memory.

A stream of data input values is received on an input port of the PEMP. An input data value can be any type of data such as, for example, packet data or sensor data. Each such input data value is then characterized by the data characterizer, thereby generating a characterization value associated with the input data value. Typically, the data characterizer is an amount of high-speed combinatorial logic. From the various bits of the characterization value, a circuit (for example, a TCAM) determines a task that should be done and generates a task assignment. The task indicated by the task assignment is therefore dependent on the data of the input data value. An input picoengine selector of the picoengine and task assignor selects a next one of the plurality of picoengines in the picoengine pool. This picoengine, when it is ready and available to do processing, is then made to receive the input data value and the associated task assignment. The picoengine then begins performing the assigned task on the input data value as indicated by the task assignment. Performing the assigned task on the associated input data value may also, for example, involve using parts of the characterization value in lieu of referring back to the original input data value bits, performing lookup operations locally or using a transactional memory resource, performing purely logical operations, performing counting operations, performing data logging or sorting operations, and performing arithmetic operations. In this sense the assigned task may be performed on the associated input data value by indirectly using other information related to the input data value. Once the picoengine has been assigned the task, the next picoengine in the sequence is supplied with the next input data value and a task assignment for that next input data value. In this way, the picoengine selector selects picoengines one-by-one in a sequence, and each successively selected picoengine receives the next input data value of the stream along with an associated task assignment, where the task assignment is generated based on the data of the input data value.

The output data reader also includes a picoengine selector. The output picoengine selector selects picoengines one-by-one in the very same sequence that the input picoengine selector uses to select picoengines for task assignment purposes. If the next picoengine, as selected by the output picoengine selector, indicates that it has completed its assigned task and has generated an output data value, then the output value from the selected picoengine is output from an output port of the PEMP. The output picoengine selector then selects the next picoengine in the sequence and waits for this next picoengine to indicate that it has data to output. Accordingly, the output picoengine selector selects the picoengines in the same order that tasks were assigned to picoengines, so that when the next picoengine in the sequence has an output data value the output data value will be output from the PEMP. From the high-level overall perspective of the PEMP, the PEMP receives a stream of input data values and outputs a stream of output data values. In some embodiments, the size of the output data value is the same as the size of the corresponding input data value. In other embodiments, the size of the output data value is different from the size of the corresponding input data value.

In one example, the picoengines are all identical, very small, specialized processors. A picoengine is special in at least two respects. First, a picoengine does not have an instruction counter. Because it does not have an instruction counter, the picoengine can be made to be small because its pipeline has only a small amount of control circuitry. Second, a picoengine only fetches instructions as a result of the operation of a fetch instruction executed by the picoengine. A picoengine is made to perform one task on the input data as opposed to another task, by injecting an initial instruction into the picoengine where the initial instruction is a fetch instruction that causes the picoengine to fetch instructions at the beginning of a task program of instructions for the appropriate task, as opposed to causing the picoengine to fetch instructions at the beginning of a task program of instructions for another task. For each task to which a picoengine can be assigned, the local memory to the picoengine contains a different task program of instructions. The assigning of a task to a picoengine involves the picoengine and task assignor injecting a fetch instruction into the picoengine so that the picoengine will then fetch instructions of the appropriate task program. When a picoengine completes its assigned task, the picoengine executes an instruction that causes the picoengine's "PE has data to be read" signal to be asserted. In one advantageous aspect, the different task programs are not actually totally different amounts of code, but rather the different task programs use some common sections of code. The using of common sections of code between task programs allows the code in the memories to be compacted.

The number of different picoengines selected in one incrementing iteration through the picoengine selection sequence is programmable. The PEMP includes a configuration information input port through which configuration information is loaded into the PEMP. Through the configuration input port: 1) the contents of the TCAM can be changed so that the task assignment the TCAM outputs for a given characterization value is changed, 2) the number of picoengines employed can be changed, and 3) the picoengine picking sequence can be changed.

In a second novel aspect, the PEMP includes power management circuitry (for example, a Look Up Table (LUT) circuit). If the number of picoengines selected in the sequence is less than the total number of picoengines in the picoengine pool, then some picoengines in the pool will not be used. The power management circuitry detects this condition and supplies "PE power enable signals" to the picoengines of the pool so that unused picoengines will automatically be disabled, thereby reducing power consumption. If some picoengines are not used, then it is also possible that some of the memories of the picoengine pool will not be accessed by any picoengine. The power management circuitry also supplies "memory power enable signals" to the memories in the picoengine pool so that any such unused memories will be disabled, thereby reducing power consumption. In some examples, the number of picoengines employed and/or the sequence used to select picoengines is changed in order to adjust a processing power versus power consumption tradeoff. The number of picoengines employed and/or the sequence used maybe changed on-the-fly as the PEMP is processing a stream of input data values so that the amount of processing power and memory resources brought to bear is dynamically adjusted to match the demands of the input data stream. If the number of picoengines employed is not changed, the sequence can still be changed in order to adjust the amount of memory resources or memory access available to each used picoengine.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 is a table that sets forth how the connections in the connection matrix 54 of FIG. 6 are made.

DETAILED DESCRIPTION

Reference will now be made in detail to background examples and some embodiments of the invention, examples of which are illustrated in the accompanying drawings. In the description and claims below, relational terms (such as "upper", "uppermost", "topmost", "lower", "bottom", "bottommost", "left" and "right") may be used to describe relative orientations between different parts of a structure being described, and it is to be understood that the overall structure being described can actually be oriented in any way in three-dimensional space.

Figure 1:
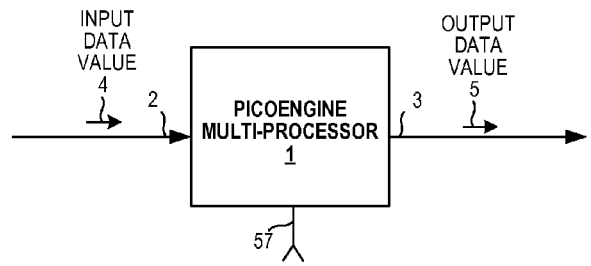
FIG. 1 is a high-level diagram of a picoengine multi-processor (PEMP) 1 in accordance with one novel aspect.

FIG. 1 is a high-level block diagram of a picoengine multi-processor (PEMP) 1 in accordance with one novel aspect. The PEMP 1 receives input data to process on input port 2, processes the data thereby generating output data, and outputs the output data on output port 3. The input data in this case is a stream of multi-bit digital input data values. Reference number 4 identifies one of the input data values. The output data also is a stream of multi-bit digital output data values, where there is an output data value in the output data stream for each input data value in the input data stream. Reference number 5 identifies one of the output data values.

Figure 2:
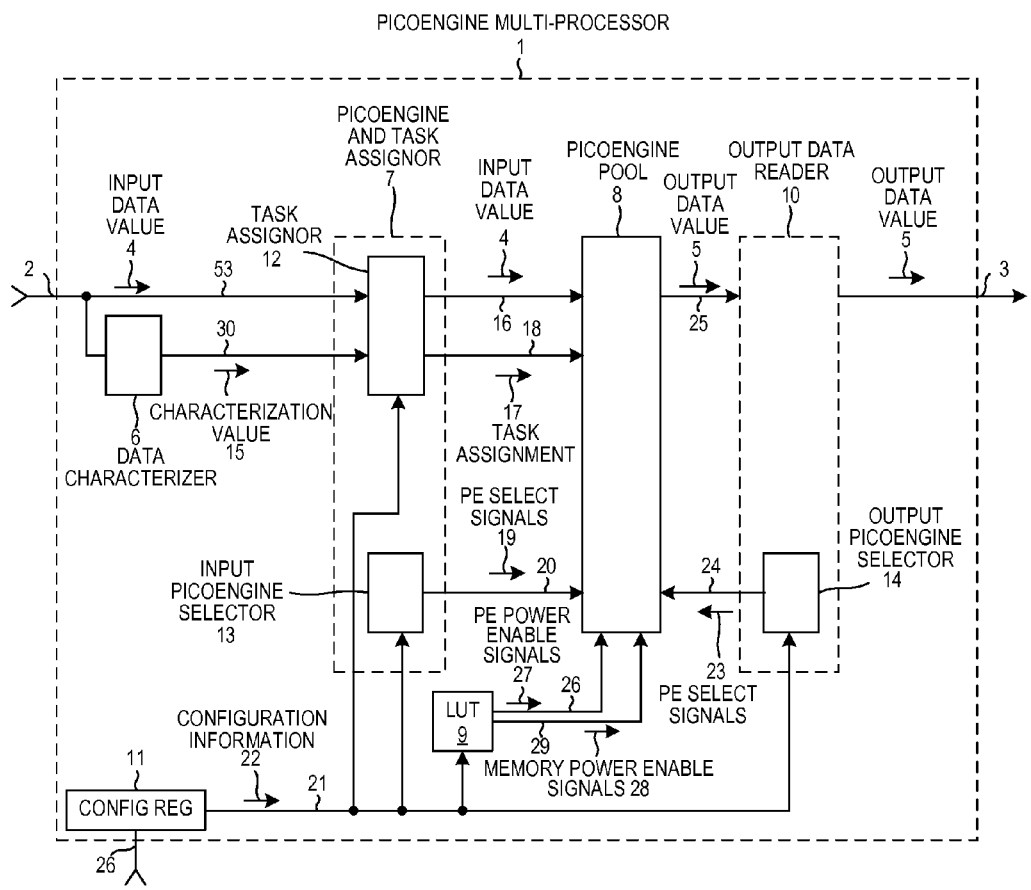
FIG. 2 is a simplified block diagram of PEMP 1 of FIG. 2.

FIG. 2 is a more detailed diagram of the PEMP 1 of FIG. 1. PEMP 1 includes a data characterizer 6, a picoengine and task assignor 7, a picoengine pool 8, a Look Up Table (LUT) circuit 9, an output data reader 10, and a configuration register 11. The picoengine and task assignor 7 in turn includes a task assignor 12 and an input picoengine selector 13. The output data reader 10 includes an output picoengine selector 14.

In operation, the input data value 4 is received onto PEMP 1 via input port 2. The data characterizer 6 analyzes the input data value 4 and generates a characterization value 15. Typically, the data characterizer is an amount of high-speed combinatorial logic. In this example, the characterization value 15 is a multi-bit digital value, each bit of which indicates whether the corresponding input data value 4 has a corresponding characteristic. At a particular time, the input data value 4 and the corresponding characterization value 15 are clocked into the task assignor 12 from conductors 53 and 30. The input data value 4 is then available on conductors 16 to the picoengine pool 8. In a preferred embodiment, both the input data value 4 and its corresponding characterization value 15 are supplied together to the picoengine pool 8. Regardless of whether the input data value alone or the input data value and its characterization value are supplied together to the picoengine pool, the task assignor 12 receives the characterization value 15 and from it generates an appropriate task assignment 17. The task assignment 17 is supplied to the picoengine pool 8 via conductors 18. The task assignment 17 is indicative of one of several different processing tasks that the picoengine pool can be instructed to perform on the input data value.

The picoengine pool 8 includes a large number (in this case forty-eight) of small processors, referred to as "picoengines". In addition, picoengine pool 8 includes a number of associated memories (in this case there are twelve local memories), where sets of instructions that the picoengines can execute are stored in the memories. The input picoengine selector 13 assigns one of the picoengines the task to handle the input data value 4. The assigned picoengine is indicated by the PE select signals 19 that are output by the input picoengine selector 13 onto conductors 20. In the present example, the PE select signals 19 are forty-eight single bit digital signals, where each individual signal is a signal that is carried by a corresponding one of forty-eight conductors 20 to a corresponding one of the forty-eight picoengines. The PE select signal indicates whether the corresponding picoengine is selected to receive the task of processing the input data value. Only one of the PE select signals is asserted at a time, so at most one picoengine is selected at a time. As input data values pass input PEMP 1, the input picoengine selector 13 assigns picoengines one-by-one in one of a plurality of selected sequences. The particular sequence that is used is determined by three bits of the configuration information 22 on conductors 21. Picoengines are selected one-by-one in the selected sequence until each of picoengines has been selected, and then the sequence repeats. In the case of input data value 4, a picoengine PE5 is selected to perform the assigned task on this input data value. The picoengine PE5 is selected due to the PE select signal for PE5 being asserted, and in response picoengine PE5 receives the input data value 4 from conductors 16 and receives the task assignment 17 from conductors 18. The picoengine PE5 then executes instructions out of one or more of the memories of the picoengine pool 8, thereby performing the assigned task on the input data value 4 as indicated by the task assignment 17.

In addition to the input picoengine selector 13, there is the output picoengine selector 14. The output picoengine selector 14 also generates PE select signals 23 and supplies these PE select signals to the picoengine pool 8 via conductors 24. The PE select signals 23 supplied by the output picoengine selector 14 are similar to the PE select signals 19 supplied by the input picoengine selector 13 in that there are forty-eight PE select signals, one for each of the forty-eight picoengines. Only one of the PE select signals 23 is asserted at a given time, so the PE select signals 23 can only identify one picoengine at a given time. The output picoengine selector 14 selects picoengines one-by-one in the same sequence that the input picoengine selector 23 used to assign picoengines. In the present example, when the picoengine PE5 that processed the input data value 4 completes its task, it generates the output data value 5. The PE select signals 23 identify picoengine PE5 to be the next picoengine to output its data. The picoengine PE5 receives the PE select signal. This signal is asserted. In response, the picoengine PE5 outputs the output data value 5. The output data value 5 passes via conductors 25, through the output data reader 10, and to the output port 3. Accordingly, the input picoengine selector assigns picoengines in the selected sequence, and the output picoengine selector uses this same selected sequence to read the resulting output data values from the picoengines. The configuration information 22 determines the sequence used. The configuration information 22 is loaded into PEMP 1 via configuration input port 57. For each input data value, the task performed is dependent upon the input data itself, where the task assigned is determined by the characterization value 15 that in turn is based on the input data value.

The particular sequence used by the input picoengine selector 13 and the output picoengine selector 14 is determined by three bits of the configuration information 22 on conductors 21. In some sequences, there are more picoengines in the picoengine pool 8 than there are separately assigned picoengines in the sequence. Accordingly, as the PE select signals are cycled through their sequences, some of the picoengines in the picoengine pool are never assigned a task. LUT circuit 9 supplies a PE power enable signal to each of the picoengines. Each PE power enable signal is communicated from the LUT circuit 9 to the corresponding picoengine via a dedicated conductor. The forty-eight conductors that carry the PE power enable signals are identified by reference numeral 26. If the PE power enable signal is not asserted, then the picoengine that receives the PE power enable signal is not enabled (is disabled). From the configuration information 22, LUT circuit 9 determines which ones of the picoengines will not be used and outputs appropriate PE power enable signals 27 to disable those unused picoengines. In one example, the PE power enable signal causes its corresponding picoengine to be disabled by causing the clock signal of the picoengine to be gated off so that the picoengine is not clocked. If the picoengine is not being clocked, then its power consumption is reduced. In another example, the PE power enable signal causes its corresponding picoengine to be disabled by freezing data going through the data path of the picoengine. This also causes the power consumption of the picoengine to be reduced because circuit nodes in the data path of the picoengine do not switch.

In addition to outputting PE power enable signals 27, the LUT circuit 9 also outputs memory power enable signals 28. In the present example, there are twelve of these signals, each being communicated across a dedicated conductor to the corresponding memory in picoengine pool 8. The twelve conductors that carry the twelve memory power enable signals are identified by reference numeral 29. If an assigning sequence does not use particular picoengines, then it is possible that one or more of the memories in the picoengine pool will not be accessed by any picoengine. Whether a particular memory will be accessed can be determined from the configuration information. LUT circuit 9 therefore outputs the memory power enable signals 28 to the memories in the picoengine pool so that any memory that is not used (given the particular assigning sequence being used) will be disabled. In one example, a memory power enable signal can disable its corresponding memory by reducing the voltage of the supply voltage supplied to the memory. In another example, a memory power enable signal can disable its corresponding memory by turning off sense amplifiers in the memory. The LUT circuit 9 can be implemented in any suitable way known in the art for performing the translation function of a look up table or decoder such as, for example, an amount of combinatorial logic or a memory.

Figure 3:
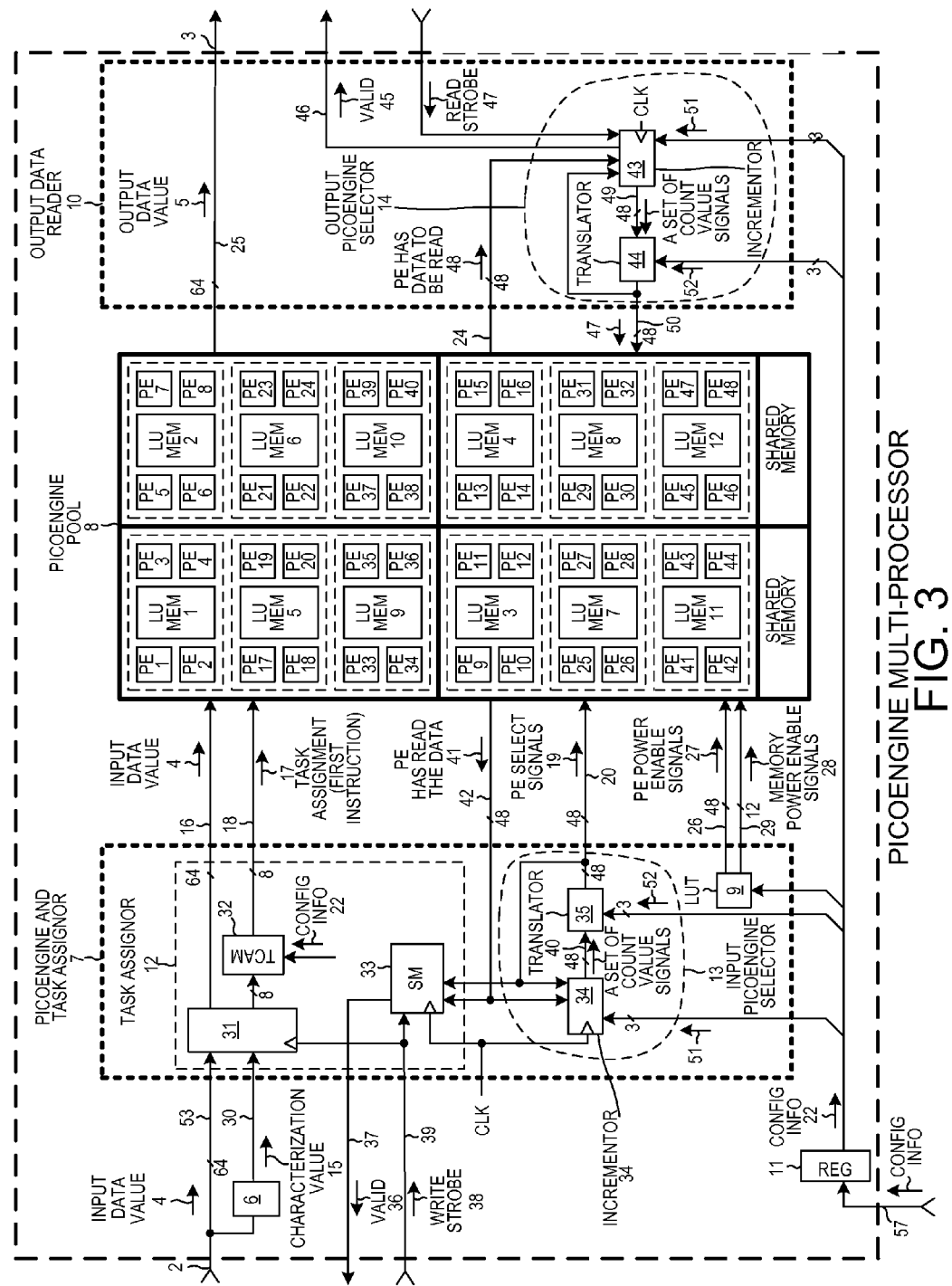
FIG. 3 is a still more detailed diagram of PEMP 1 of FIGS. 1 and 2.

FIG. 3 is a still more detailed diagram of PEMP 1 of FIGS. 1 and 2. Task assignor 12 includes a register 31, a TCAM (Tertiary Content Addressable Memory) 32, and a state machine 33. Input picoengine selector 13 includes an incrementor 34 and a translator 35. State machine 33 monitors register 31. If register 31 is free and does not contain an input data value that has not been read into an assigned picoengine, then the state machine 33 outputs a valid signal 36 on conductor 37. Another entity (not shown) external to the picoengine multi-processor monitors the valid signal 36. If the picoengine multi-processor 8 is indicated as being available for receiving an input data value due to the valid signal 36 being asserted, then the external entity supplies an input data value onto input port 2 and asserts the strobe signal 38 on conductor 39 and clocks the input data value and the associated characterization value into register 31. The characterization value is then available on the outputs of register 31, and is supplied onto inputs of the TCAM 32. For each characterization value, the TCAM 32 outputs a task assignment. The content of the TCAM is loaded beforehand via the configuration port 57 and the configuration register 11. The task assignment output by the TCAM 32 is supplied via conductors 18 to the picoengine pool 8. At this point, the input data value is being supplied to the picoengine pool 8 via conductors 16 and the associated task assignment is also being supplied to the picoengine pool 8 via conductors 18.

Meanwhile, the translator 35 is outputting PE select signals 19 that identify the next picoengine to be selected. There are forty-eight such PE select signals, one of which is supplied to each of the forty-eight picoengines. Each picoengine outputs a "PE has read the data" signal back to the picoengine and task assignor 7. There are forty-eight "PE has read the data" signals 41 supplied back via conductors 42. When the selected picoengine is ready to receive a task, it clocks in the input data value and the task assignment and asserts its "PE has read the data" signal. State machine 33 uses this information to determine that register 31 is then free and available to receive the next input data value. The incrementor 34 of the input picoengine selector 13 uses this information as a prompt to increment. The incrementor 34 then increments once, thereby outputting the next "set" of count value signals on conductors 40. In the present example, the incrementor 34 increments by changing the "set" of count value signals. Each such "set" is a set of forty-eight signals, one and only one of which is asserted at a given time. One such "set" is a count. For each different "set", a different one of the forty-eight signals is asserted. As the incrementor increments, the one of the forty-eight signals that is asserted changes. The translator 35 is an amount of combinatorial logic that receives the "sets" of count value signals from the incrementor 34 and translates each such set into a corresponding set of forty-eight PE select signals. When the previously selected picoengine (as indicated by the PE select signals 19) indicates that it has read the input data value and the associated task assignment (by asserting its "PE has read the data" signal), then the incrementor 34 increments so that the PE select signals 19 will change to select the next picoengine in the sequence. In this way picoengines are assigned tasks of processing successively received input data values. After a picoengine has read in an input data value and its associated task assignment, the incrementor is incremented once to select the next picoengine in the sequence in anticipation of assigning that next picoengine the next input data value and the next task assignment.

The output data reader 10 operates by reading the output data values from picoengines in the picoengine pool 8 in the same sequence as was used to assign tasks to the picoengines of the picoengine pool 8. The output picoengine selector 14 includes an incrementor 43 and a translator 44. An entity (not shown) external to the picoengine multi-processor 1 reads output data values from the PEMP 1. If an output data value is available on output port 3 for being read by the external entity, then the valid signal 45 on conductor 46 is asserted. The external entity, in response, asserts the read strobe signal 47 and latches in the output data value. The incrementor 43 responds to the asserted strobe signal by incrementing once, thereby outputting the next "set" of count value signals in the sequence. This next "set" of count values signals is supplied to the translator 44 via conductors 49. The incrementor 43 outputs "sets" of count value signals in the same way described above hat incrementor 34 outputs "set" of count value signals. There are forty-eight such signals, only one of which is asserted at a given time. As the incrementor increments, the one of the signal that is asserted changes. Translator 44 receives the next "set" of count value signals and translates this next set of count value signals into a corresponding next set of PE select signals 47. The next set of PE select signals 47 is communicated to the picoengine pool 8 via conductors 50 so that the next picoengine in the sequence is selected. The selected picoengine then indicates that is has data to be read by asserting its "PE has data to be read" signal back to the incrementor 43. There are forty-eight "PE has data to be read" signals 48 and are communicated back to the incrementor 43 via conductors 24. When the incrementor 43 receives notification that the selected picoengine has data to be read, it then asserts the valid signal 45 once more so the external entity can read this next output data value from output port 3. This process of reading picoengines in sequence is repeated using the same sequence that as used to assign the picoengines tasks.

In the example described above, the incrementors 34 and 43 increment forty-eight times through forty-eight different "sets" of count values. After forty-eight increments, the incrementors roll over in their sequences. This is, however, just an example. The incrementors 34 and 43 are programmable to roll over in their sequences after having output a selectable count number 51 of different sets of count values. This count number 51 is supplied to the incrementors 34 and 43 by three bits of the configuration information 22. For example, even though there are forty-eight picoengines in the picoengine pool, the incrementors 34 and 43 may be programmed only to increment twenty-four times before they roll over in their counts. In such an example, twenty-four of the picoengines will be assigned tasks over and over again in sequence, whereas the other twenty-four of the picoengines will not be used at all. Picoengines that are not used are automatically disabled by LUT circuit 9. Similarly, any associated memories that are not used are automatically disabled by LUT circuit 9. As the workload demanded of the picoengine pool 8 goes up and down as PEMP 1 is used, the count number 51 can be dynamically changed on-the-fly to adjust the number of picoengines employed. If there is a greater workload then a larger number 51 may be set so that more picoengines will be employed, whereas if there is a smaller workload then a smaller count number 51 may be set so that fewer picoengines will be employed. Even if the workload of PEMP 1 is stable and does not change, the number of picoengines employed may nevertheless be adjusted to achieve a different power consumption versus latency tradeoff. Depending on how the instructions executed by the picoengines are written, a smaller number of picoengines may be able to handle the workload thereby using fewer memory resources at the expense of higher processing latency while achieving lower power consumption. A larger number of picoengines may handle the same workload using more memory resources at the expense of higher power consumption while achieving lower processing latencies. The count number 51 can therefore be adjusted to change the power consumption versus latency tradeoff. If the count number 51 is changed on-the-fly while the picoengine multi-processor 1 is in operation, then an incrementor continues to count up using its last count number until it rolls over, and only then does the incrementor use the new count number.

In addition to changing to a new count number 51 at the time of incrementor roll over, a new sequence can also be put into use at the time of incrementor roll over. The sequence employed is determined by the translation done by the translators 35 and 44. In the present example, one of six translations is employed at a given time, with the particular translation that is employed being determined by a three-bit sequence number 52. The three-bit sequence number 52 is supplied to the translators 35 and 44 by three bits of the configuration information 22.

Figure 4:
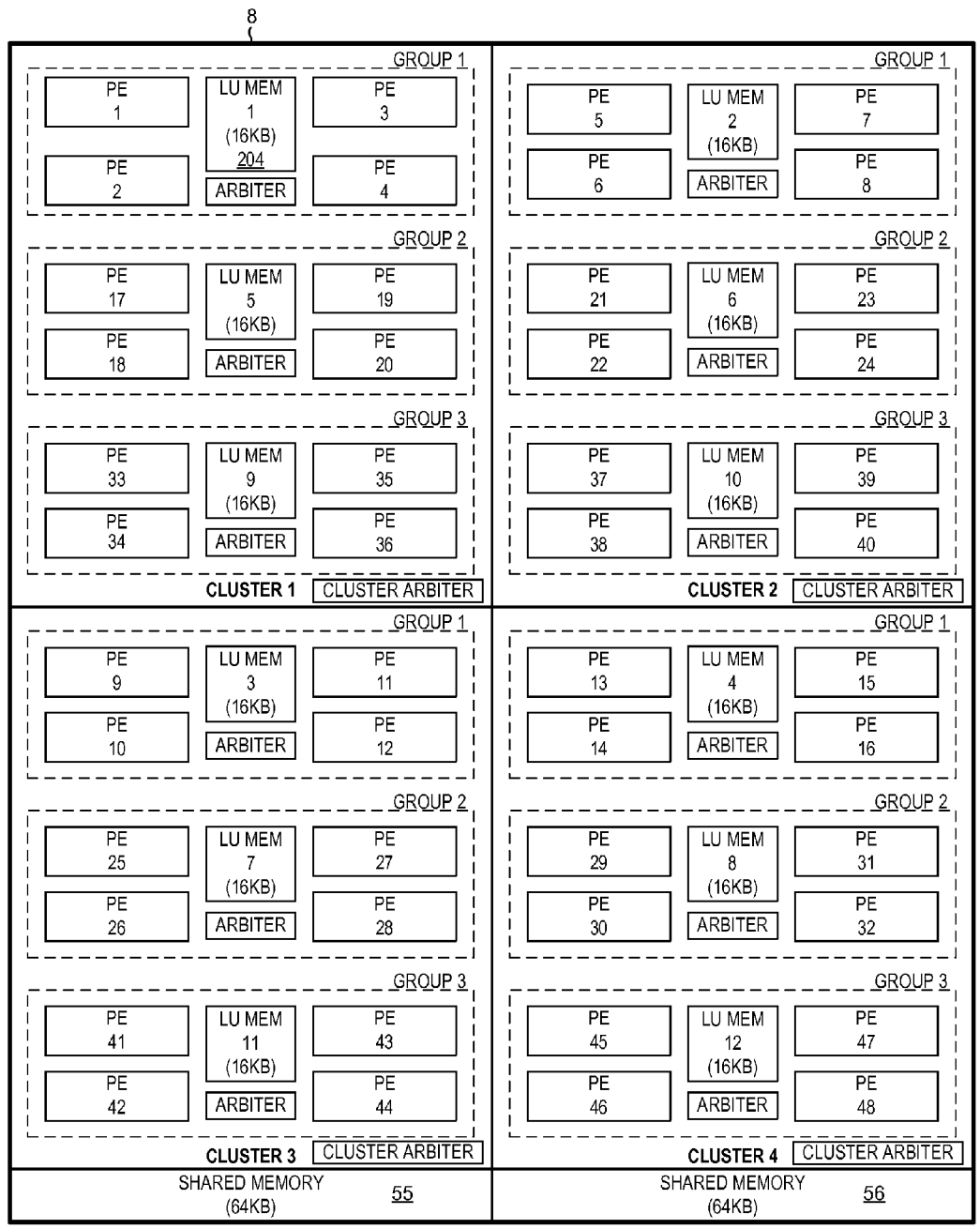
FIG. 4 is a block diagram of the picoengine pool 8 within PEMP 1 of FIGS. 1, 2 and 3.

FIG. 4 is a diagram of the architecture and layout of picoengine pool 8 in the particular example being described. The picoengine pool 8 is divided into four clusters, denoted CLUSTER1-CLUSTER4. Each cluster is in turn divided into three groups, denoted GROUP1-GROUP3. Each group is in turn divided into four picoengines and a local memory. The picoengines of a group can access and read instructions out of the memory of the group. If only one picoengine in a group is used, then that picoengine has better memory access and more memory resources available to it than if two picoengines in the group are being used the access to the memory has to be shared between multiple picoengines. The forty-eight picoengines PE1-PE48 of the picoengine pool 8 are indicated in FIG. 4. The twelve local memories LUMEM1-LUMEM12 are indicated. In this example, only the four picoengines in a group access the local memory of that group. Therefore if all four picoengines of a group are unused in the sequence and have therefore been disabled, then the local memory of the group is also unused and is disabled by LUT circuit 9. In addition to the picoengines and the local memories, the picoengine pool 8 further includes two shared memories 55 and 56. Any of the picoengines on the left half of FIG. 4 can access shared memory 55, and any of the picoengines on the right half of FIG. 4 can access shared memory 50. A picoengine's accessing of a shared memory is slower as compared to the picoengine's accessing of its local memory in the group. If all the memories on the left half of FIG. 4 are unused in the particular sequence being used, then the shared memory 55 is disabled. Similarly, if all the memories on the right half of FIG. 4 are unused in the particular sequence being used, then the shared memory 50 is disabled. There are two additional "memory power enable signals" and are output by the LUT circuit 9 that extend to the shared memories 55 and 56 in order to allow the shared memories to be selectably disabled. Within the picoengine pool 8, all the picoengines are coupled to be able to read input data values from conductors 16. All the picoengines are coupled to be able to read task assignments from conductors 17. Within the picoengine pool 8, all the picoengines are also coupled to be able to supply output data values onto the same set of conductors 25. In one example, the picoengine pool 8 circuit is laid out on the semiconductor surface of an integrated circuit substantially as shown in FIG. 4.

In the presently described example, all of the picoengines are identical. A picoengine is a special very small processor that has a sequencer pipeline. The sequencer pipeline includes: a fetch stage, an instruction decode stage, a read stage, and an execute stage. The picoengine does not have an instruction counter (also called a program counter) and does not fetch instructions unless that fetching is the operation called for by a specific fetch instruction that the picoengine is executing. An instruction is injected into beginning of the pipeline, and is then decoded in the decode stage. Any data needed for the instruction is then obtained by the read stage. For example, this data may be data from the input data value. Once the data necessary for the operation has been obtained, then the execute stage performs an operation on the data as specified by the instruction. There are only two ways for an instruction to be supplied into the beginning of the pipeline: 1) by an instruction being injected from the task assignment conductors 18, and 2) as a result of a fetch instruction that was previously executed by the picoengine. The initial task assignment to the picoengine is carried out by TCAM 32 injecting an initial instruction across the conductors 18 and into the beginning of the selected picoengine's pipeline. The value output by the TCAM 32 is therefore such an initial instruction. This initial instruction then is processed by the picoengine to be the first instruction the picoengine performs after having been assigned a task. The injected initial instruction, however, is a fetch instruction to fetch a number of instructions that are stored in memory starting at an address specified by the fetch instruction. When the picoengine executes this injected initial instruction, it fetches the instructions starting at the specified address in the memory, and these instructions are supplied one by one into the beginning of the pipeline. The next instruction to be executed is therefore the first instruction fetched. For example, if a first task is to be assigned to the picoengine, then the injected initial instruction (the one injected across conductors 18) causes the picoengine to fetch a first program of instructions that are code for performing the first task on the input data value. For example, if a second task is to be assigned, then the injected initial instruction causes the picoengine to fetch a second program of instructions that are code for performing the second task on the input data value. The task assignment 17 of FIG. 3 is therefore implemented as the injecting of an initial instruction into the selected picoengine, where the initial instruction is a fetch instruction to fetch the beginning instructions of the appropriate one of several programs stored in memory. The instructions fetched may in turn conclude with another fetch instruction to fetch still more instructions. At the end of execution of the program, execution of an instruction causes the picoengine to assert its "PE has data to be read" signal. If no more instructions are injected into the beginning of the picoengine's pipeline, then the data path of picoengine stops. As stated above, the picoengine does not have an instruction counter and does not fetch instructions unless that fetching is the operation of a fetch instruction.

Figure 5:
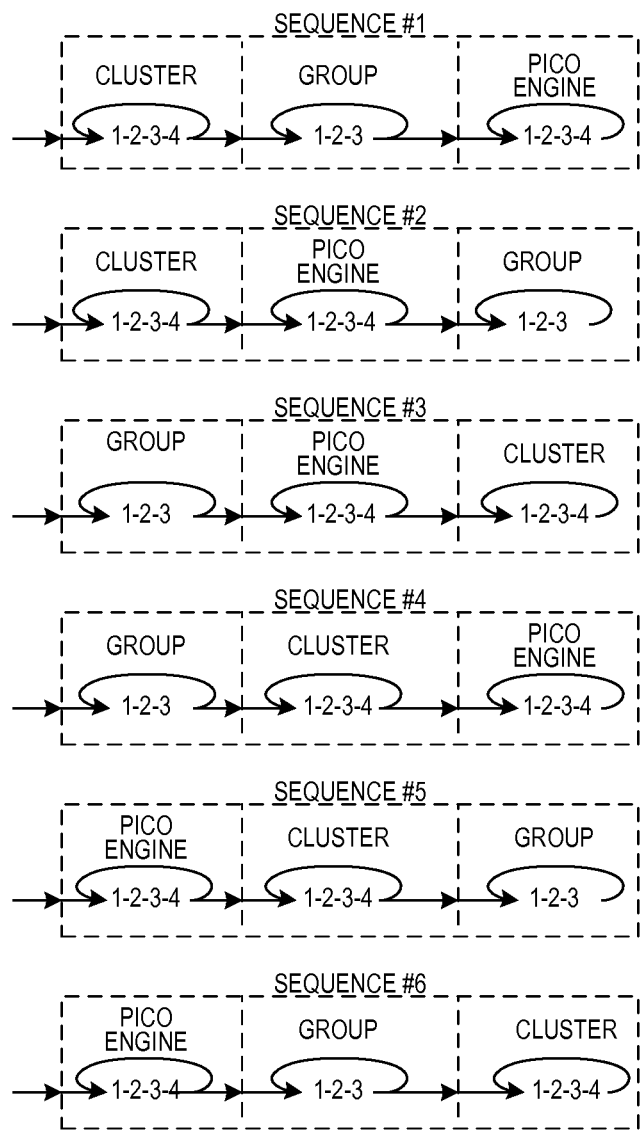
FIG. 5 is a diagram that illustrates six picoengine selection sequences (one of which is selected to be employed at any given time in the PEMP 1 of FIGS. 1, 2 and 3).

FIG. 5 is a diagram that illustrates the six sequences. In the illustrations of FIG. 5, the arrows indicate the sequence of incrementing. By way of illustration, the graphical notation in FIG. 5 of the sequence of SEQUENCE#1 is explained textually below. Each of the forty-eight picoengines is identified by a picoengine number, a group number, and a cluster number. Initially, the cluster number is 1, the group number is 1, and the picoengine number is 1. With the group number fixed at 1 and with the picoengine number fixed at 1, the cluster number is incremented from 1, to 2, to 3, to 4. As indicated by the looped arrow in the cluster box, the cluster number then returns to 1, but there is also a left to right arrow extending from the cluster box to the group box. This left to right arrow indicates that the group number should be incremented. In this case, the group number is incremented from 1 to 2 at the same time that the loop back arrow indicates that the cluster number should change from 4 to 1. With the group number at 2 and the picoengine number at 1, the cluster number is again incremented from 1, to 2, to 3, and to 4. Again, the looped arrow returns to cluster 1, but the left to right arrow extends from the cluster box to the group number box. This indicates an increment of the group number from 2 to 3. Again, with the group number at 3 and with the picoengine number at 1, the cluster number is incremented from 1, to 2, to 3, and to 4. Each time the cluster number increments from 1, to 2, to 3 and to 4, the group number is incremented once. When the group number has been incremented to be 3, and is then to be incremented again, the group number returns to 1 as indicated by the looped arrow in the group box. There is, however, also a left to right arrow that extends from the group box to the picoengine box. This arrow indicates that the picoengine number should be incremented. Because the picoengine number was 1, it is incremented to 2. With the picoengine number now at 2, the entire process repeats. Each time it repeats, the picoengine number is incremented, until it has repeated when the picoengine number is 4. At this point all of the forty-eight picoengines have been selected. For purposes of this notation of sequences, the picoengine 1 is the picoengine in the upper left of a group, picoengine 2 is the picoengine in the lower left of a group, picoengine 3 is the picoengine in the upper right of a group, and picoengine 4 is the picoengine in the lower right of a group. Group 1 is the uppermost group in a cluster, group 2 is the middle group in a cluster, and group 3 is the bottommost group in a cluster. The changing of a "set" of count value signals as output by an incrementor from one set to the next set is what causes an increment. Which one of the six sequences is used is determined by the three bits 52 supplied to the translators 35 and 44.

Figure 6:
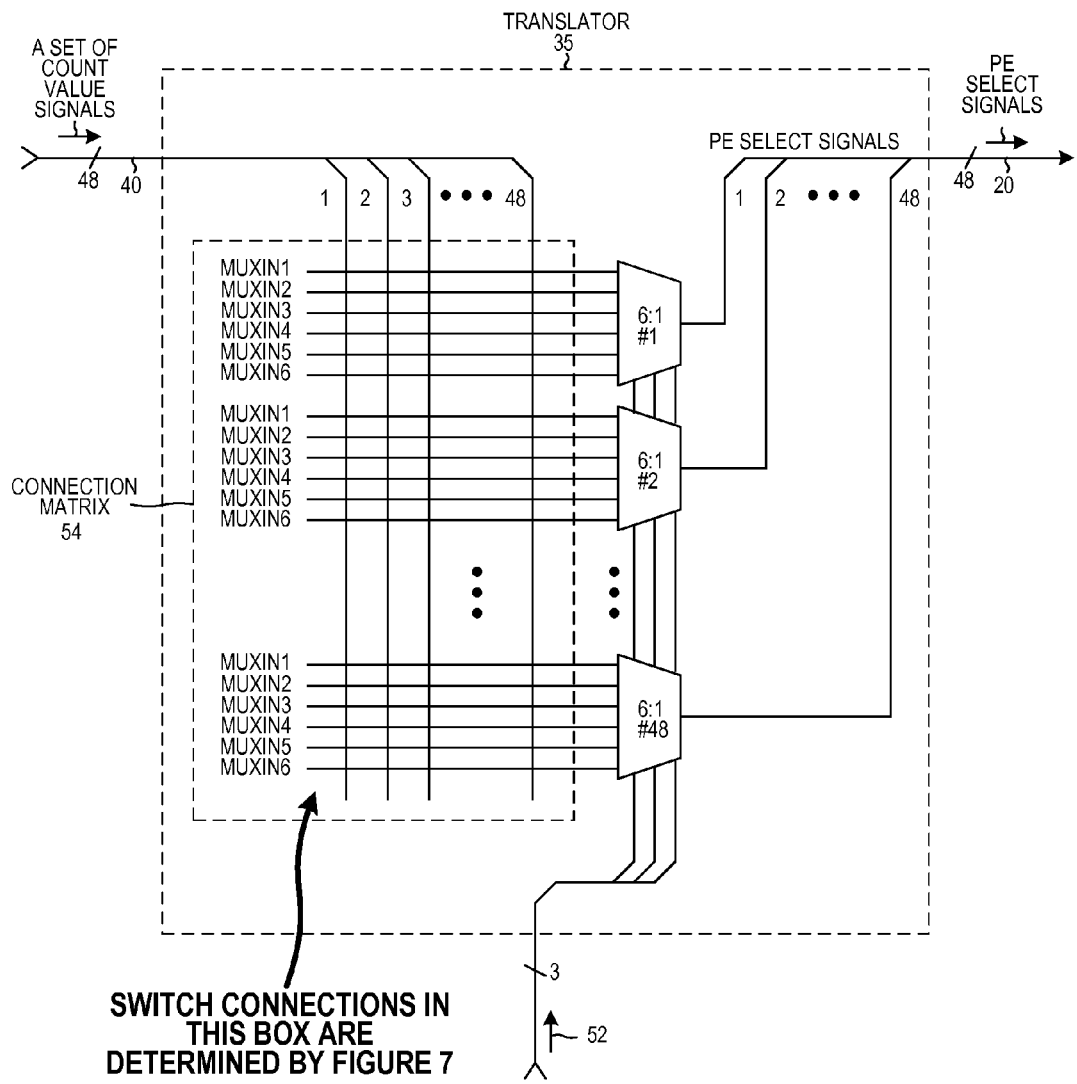
FIG. 6 is a circuit diagram of translator 35 of the PEMP 1 of FIGS. 1, 2 and 3.

FIG. 6 is a more detailed diagram of translator 35. The circuitry of the two translators 35 and 44 is identical. A set of count value signals is received on conductors 40 from incrementor 34. The forty-eight count value signals extend to the connection matrix 54. The column of forty-eight 6:1 multiplexers (denoted 6:1#1, 6:1#2–6:1#48) receives input signals from the connection matrix 54. Each multiplexer has six input data leads and associated horizontally-extending conductors denoted MUXIN1, MUXIN2 and so forth. The first 6:1 multiplexer 6:1#1 outputs the PE select signal for PE1, the second 6:1 multiplexer 6:1#2 outputs the PE select signal for PE2, the third 6:1 multiplexer 6:1#3 outputs the PE select signal for PE3, and so forth. In this notation, how the picoengines are numbered from PE1 to PE48 is set forth in FIG. 4. The forty-eight PE select signals 19 are supplied to the corresponding forty-eight picoengines in picoengine pool 8 via conductors 20. As explained above, at any given time only one of the incoming forty-eight count value signals is asserted, and at any given time only one of the outgoing forty-eight PE select signals is asserted. Which one of the six selectable sequences is used is determined by the three-bit value 52 received via conductors 21 from the configuration register 11. If the three bits of value 52 are "000" then the first sequence SEQUENCE#1 is selected, if the three bits of value 52 are "001" then the second sequence SEQUENCE#2 is selected, and so forth.

FIG. 7 is a table that sets forth the connections in the connection matrix 54 of FIG. 6. In each row, the number in the leftmost column (the column labeled "6:1 MUX") contains the number of one of the forty-eight 6:1 multiplexers. The number in the "MUX IN 1" column is the number of the incoming count value signal that is coupled through the connection matrix to the first data input of the 6:1 multiplexer, the number in the "MUX IN 2" column is the number of the incoming count value signal that is coupled through the connection matrix to the second data input of the 6:1 multiplexer, and so forth. If the three-bit value 52 is "000" then the 6:1 multiplexers are controlled to couple the signals on their MUXIN1 inputs to their outputs, if the three-bit value 52 is "001" then the 6:1 multiplexers are controlled to couple the signals on their MUXIN2 inputs to their outputs, and so forth. Accordingly, each column of MUXIN values encodes a different translation function. Selecting the signals on the MUXIN1 inputs to be the multiplexer outputs results in the sequence SEQUENCE#1 of FIG. 5, selecting the signals on the MUXIN2 inputs to be the multiplexer outputs results in the sequence SEQUENCE#2, and so forth.

Figure 8:
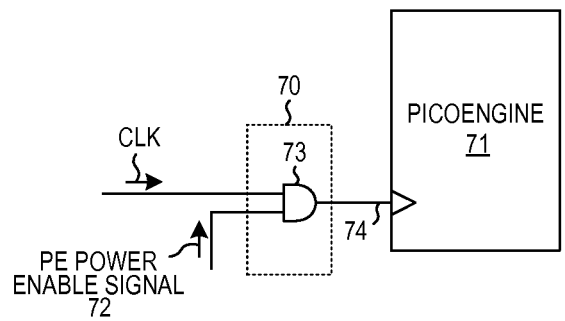
FIG. 8 is a diagram of one way that a picoengine can be disabled in response to a PE power enable signal.

FIG. 8 is a circuit diagram of one example of a clock gating circuit 70 that disables a picoengine 71 if the PE power enable signal 72 for the picoengine is not asserted. AND gate 73 does not allow the clock signal CLK to pass onto the clock input lead 74 of the picoengine if the PE power enable signal 72 is not asserted (low), whereas if the PE power enable signal 72 is asserted (high) then the clock signal CLK passes through AND gate 73 and onto the clock input lead 74 of the picoengine. If the picoengine's clock signal is gated off, then many nodes internal to the picoengine do not toggle or switch and consequently the picoengine is disabled and power consumption is reduced. PE power enable signal 72 of FIG. 8 represents one of the PE power enable signals of FIG. 3 and picoengine 71 represents one of the forty-eight picoengines in the picoengine pool of FIG. 3. The way of disabling the picoengine illustrated in FIG. 8 is just one way that a picoengine can be disabled in response a PE power enable signal. For example, a picoengine can be disabled by preventing the contents of its input register at the beginning of its pipeline from changing so that the entire data path through the picoengine is frozen. By disabling the data path in this way, circuit nodes in the data path are prevented from switching, the picoengine is disabled, and power consumption is reduced.

Figure 9:
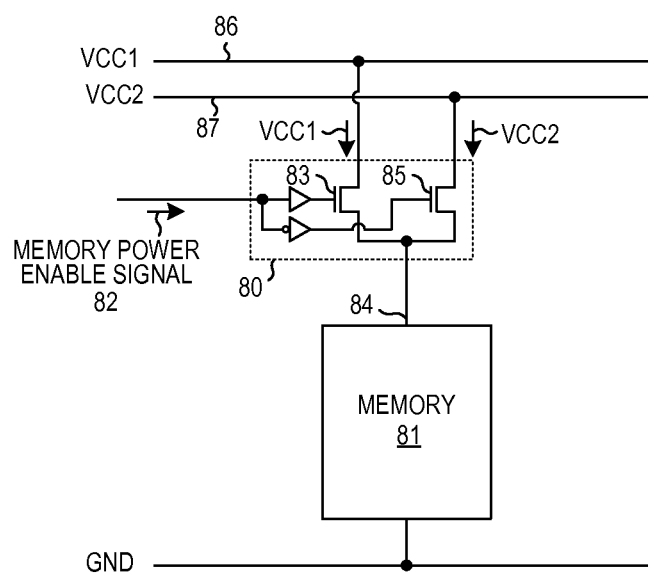
FIG. 9 is a diagram of one way that a memory can be disabled in response to a memory power enable signal.

FIG. 9 is a diagram of one example of a circuit 80 that disables a memory 81 if the memory power enable signal 82 for the memory is not asserted. If the memory power enable signal 82 is asserted (high) then power switch 83 is turned on and power switch 85 is turned off and supply voltage VCC1 from supply voltage conductor 86 is supplied through the circuit 80 and onto the supply voltage input lead 84 of the memory 81, whereas if the memory power enable signal 82 is not asserted (low) then power switch 85 is turned on and power switch 83 is turned off and supply voltage VCC2 from supply voltage conductor 87 is supplied through the circuit 80 and onto the supply voltage input lead 84 of the memory. VCC1 is the normal higher supply voltage that the memory uses when it is to be operational and is to be accessible to working picoengines. VCC2 is a lower supply voltage that is barely adequate to maintain the information content of the memory in storage, but is too low to allow for proper high-speed accessing of the memory by picoengines. By reducing the supply voltage in this way, the memory is disabled and power consumption is reduced. Memory power enable signal 82 of FIG. 9 represents one of the memory power enable signals of FIG. 3 and memory 81 represents one of the memories in the picoengine pool of FIG. 3. The way of disabling the memory illustrated in FIG. 9 is just one way that a memory can be disabled in response a memory power enable signal. For example, a memory can be disabled by turning off or disabling its sense amplifiers. In some memories, the sense amplifiers are a major consumer of power. If the sense amplifiers are disabled, then their outputs cannot switch. The memory is disabled and power consumption is reduced.

In one example, to realize an integrated circuit embodiment of the PEMP 1 of FIG. 3, the function of the each circuit block of FIG. 3 is described in a hardware description language (for example, Verilog or VHDL). A commercially available hardware synthesis program (for example, Synopsis Design Compiler) is then employed to generate digital logic circuitry from the hard description language description, where the synthesized digital logic circuitry performs the function described by the hardware description language. The picoengine pool 8 is laid out in blocks so that the organization of the clusters, and the organization of the groups, and the organization of the picoengines and local memories, and the overall floorplanning set forth in FIG. 4 is achieved. An embodiment of PEMP 1 may be made available by one company as a predesigned block of circuitry that is then incorporated into another company's integrated circuit design as a general purpose block. Such a predesigned block of IP is sometimes referred to in the art as a block of "IP". A hardware designer who incorporates the predesigned block of IP into a larger integrated circuit design need not understand or be aware of the internal structure and operation of the pre-designed block, but rather interfaces to the pre-designed block in accordance with an interface description supplied by the original designer of the predesigned block. Rather than being supplied as a block of IP to be incorporated into another integrated circuit, the novel PEMP can be supplied to end customers as a separate discrete integrated circuit of general utility in data processing applications.

Although certain specific embodiments are described above for instructional purposes, the teachings of this patent document have general applicability and are not limited to the specific embodiments described above. Not all of the processors of the pool need to be of identical construction. A mix of different types of processors having different capabilities and limitations can be provided in the pool. Similarly, all the memories in the pool need not be identical, but rather the memories may have different capabilities and limitations. By changing the number of processors employed and/or by changing the picking sequence employed, the assignment of tasks is made to take advantage of the different capabilities and limitations of the picoengines and memories depending on the data stream, the tasks to be performed, and processing objectives. Accordingly, various modifications, adaptations, and combinations of various features of the described embodiments can be practiced without departing from the scope of the invention as set forth in the claims.

What is claimed is:

1. A method, comprising:
   (a) receiving configuration information;
   (b) receiving a stream of input data values;
   (c) from each input data value of the stream generating a corresponding characterization value;
   (d) for each input data value of the stream determining a corresponding task assignment, wherein the task assignment is at least in part determined by the characterization value generated from the input data value;
   (e) assigning each input data value to one of a plurality of picoengines along with its corresponding task assignment, wherein the picoengines are assigned input data values and tasks one-by-one in a selected sequence, wherein the selected sequence is a sequence of a plurality of selectable sequences, and wherein which one of the selectable sequences is the selected sequence is determined by the configuration information;
   (f) performing the assigned tasks, wherein the performing of (f) involves each picoengine to which a task is assigned performing the task thereby generating an output data value; and
   (g) reading an output data value from each of the plurality of picoengines, wherein output data values are read from the picoengines one-by-one in the selected sequence.

2. The method of claim 1, wherein there is a plurality of tasks, wherein there is a plurality of initial instruction locations, wherein there is a one-to-one correspondence between each task of the plurality of tasks and a corresponding initial instruction location of the plurality of initial instruction locations, wherein each of the picoengines is assigned a task in (e) by causing the picoengine to fetch an initial instruction from the initial instruction location corresponding to the task, and wherein the initial instruction is an instruction of a set of instructions for performing the task.

3. The method of claim 1, wherein none of the plurality of picoengines has an instruction counter.

4. The method of claim 1, wherein each of the picoengines only performs an instruction fetch if: 1) the instruction fetch is an initial fetch caused by the picoengine having been assigned the task in (e), or if 2) the instruction fetch is an operation caused by the picoengine executing a fetch instruction.

5. The method of claim 1, wherein the assigning of (e) involves:
   (e1) causing an incrementor to increment thereby generating a set of count value signals; and
   (e2) using a translator to translate the set of count value signals into a corresponding set of picoengine select signals, wherein the corresponding set of picoengine select signals identifies one of the plurality of picoengines to which the task is assigned.

6. The method of claim 1, wherein the incrementor generates successive sets of count value signals, and each set corresponds to a different one of the picoengines.

7. The method of claim 1, wherein the incrementor generates a predetermined number of unique sets of count value signals, and wherein the predetermined number is determined by the configuration information received in (a).

8. The method of claim 1, wherein each of the picoengines executes instructions, wherein said each picoengine performs an instruction fetch, and wherein the instruction fetch causes multiple instructions to be returned to said each picoengine.

9. An apparatus comprising:
   a data input port;
   a data output port;
   a picoengine pool comprising a plurality of picoengines and a plurality of memories;
   a data characterizer that receives a stream of input data values and for each input data value of the stream generates a characterization value;
   a task assignor that receives the stream of input data values from the data input port and that receives a stream of characterization values from the data characterizer, and that outputs input data value/task assignment pairs to the picoengine pool, wherein each input data value/task assignment pair includes an input data value and a corresponding task assignment;
   an input data picoengine selector that supplies picoengine select signals to the picoengine pool such that the picoengine select signals cause picoengines of the pool to be selected one-by-one in a selected sequence, and wherein each of the selected picoengines receives a corresponding one of the input data value/task assignment pairs; and
   an output data picoengine selector that supplies picoengine select signals to the picoengine pool such that output data values are output by the picoengine pool and are supplied onto the data output port, wherein the output data values are received from picoengines in the selected sequence.

10. The apparatus of claim 9, wherein the input data picoengine selector comprises:
    an incrementor that outputs sets of count value signals; and
    a translator that translates each set of count value signals into a corresponding set of picoengine select signals.

11. The apparatus of claim 10, wherein the incrementor outputs a repeating sequence of sets of count value signals, wherein the incrementor receives configuration information, and wherein the configuration information determines the number of sets in the sequence.

12. The apparatus of claim 10, wherein the translator translates using a selected one of a plurality of translation functions, wherein the translator receives configuration information, and wherein the configuration information determines the selected one of the plurality of translation functions used by the translator.

13. The apparatus of claim 9, wherein none of the picoengines has an instruction counter.

14. The apparatus of claim 13, wherein there is a plurality of tasks, wherein there is a plurality of initial instruction locations, wherein there is a one-to-one correspondence between each task of the plurality of tasks and a corresponding one of the initial instruction locations of the plurality of initial instruction locations, wherein the task assignor assigns a task by causing an assigned picoengine to fetch an initial instruction from the initial instruction location corresponding to the task.

15. An apparatus comprising:
    a data input port;
    a data output port;
    a picoengine pool comprising a plurality of picoengines and a plurality of memories;

a data characterizer that receives a stream of input data values and for each input data value of the stream generates a characterization value;

a task assignor that receives the stream of input data values from the data input port and that receives a stream of characterization values from the data characterizer, and that outputs input data value/task assignment pairs to the picoengine pool;

first means for selecting picoengines in a selected sequence, wherein the first means supplies picoengine select signals to the picoengine pool such that the picoengine select signals cause picoengines of the pool to be selected one-by-one in the selected sequence, and wherein each of the selected picoengines receives a corresponding one of the input data value/task assignment pairs; and second means for selecting picoengines in the selected sequence, wherein the second means supplies picoengine select signals to the picoengine pool such that output data values are output by the picoengine pool and are supplied onto the data output port, wherein the output data values are received from picoengines in the selected sequence.

16. The apparatus of claim 15, wherein the first means for selecting comprises an incrementor and a translator.

17. The apparatus of claim 16, wherein the incrementor of the first means is configurable to change a number of picoengines selected in one iteration of the selected sequence.

18. The apparatus of claim 16, wherein the translator of the first means uses a selected one of a plurality of translation functions, and wherein the translator of the first means is configurable and receives configuration information, and wherein the configuration information determines the selected one of the plurality of translation functions used by the translator of the first means.

19. The apparatus of claim 15, wherein none of the plurality of picoengines has an instruction counter.

20. The apparatus of claim 15, wherein each of the picoengines only performs an instruction fetch: 1) if the instruction fetch is an initial fetch caused by the picoengine having been assigned a task, or 2) if the instruction fetch is an operation caused by the picoengine executing a fetch instruction.

21. The apparatus of claim 15, wherein execution of a fetch instruction by a picoengine causes multiple instructions to be read from a memory and to be supplied to the picoengine.

* * * * *